Patented July 19, 1932

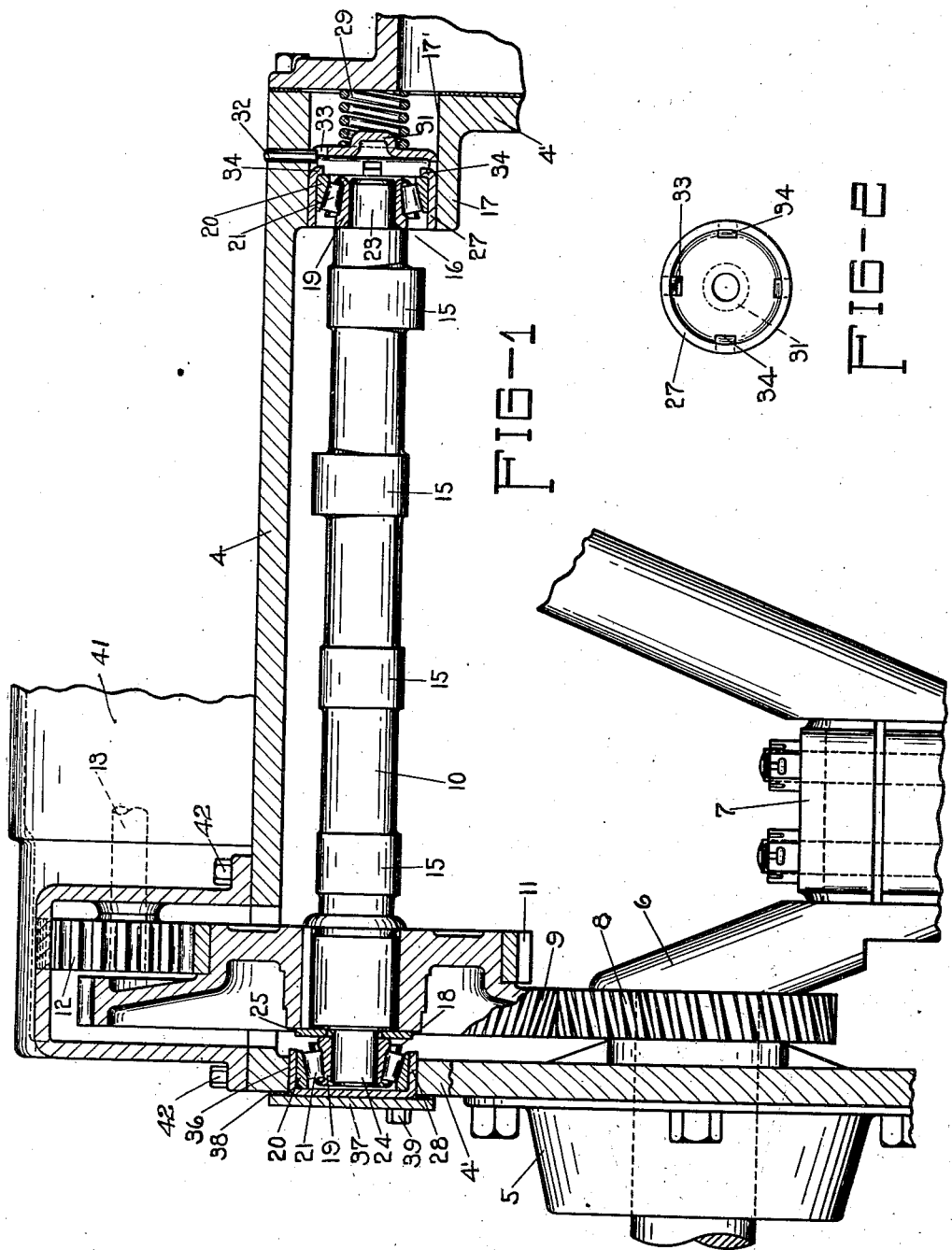

1,867,582

UNITED STATES PATENT OFFICE

HAROLD E. McCRAY, OF WATERLOO, IOWA, ASSIGNOR TO JOHN DEERE TRACTOR COMPANY, OF WATERLOO, IOWA, A CORPORATION OF IOWA

INTERNAL COMBUSTION ENGINE

Application filed September 4, 1928. Serial No. 303,828.

The present invention relates to internal combustion engines, and has particular reference to an improved mounting for the engine cam shaft.

In gear driven cam shafts a conventional practice is to employ spiral or skew gears for driving the shaft so as to make the drive as silent as possible. The diagonal tooth faces on such gears necessarily set up an end thrust in the cam shaft which acts in one direction as long as the gears are driving the shaft, but which acts in the opposite direction if the shaft tends to run ahead of the gears. Such tendency of the cam shaft to run ahead of its gear drive is caused by the pressure of the valve springs acting on the cams through the tappet rods and cam followers.

That is to say, as the peak of the cam passes the center of the cam follower, the pressure of the valve spring reacting through the tappet rod and follower imparts pressure to the reverse slope of the cam and tends to drive the cam shaft ahead of the timing gear drive. This alternating retarding and advancing pressure exerted on the cam shaft is particularly present in two cylinder four cam engines in which such reversal of pressures causes the cam shaft to shift back and forth endwise in each revolution with consequent noise and wear of the cam shaft bearings. If it is attempted to prevent this shifting of the cam shaft by confining it in thrust bearings which are set up tight to hold the shaft, difficulties arise in the differential expansions of the cam shaft and crank case. The cam shaft usually heats up as rapidly as the crank case, and owing to the fact that the steel cam shaft has a higher coefficient of expansion than the cast iron crank case, the greater expansion of the shaft causes the bearings to heat, often to the point where they score or even seize on the shaft.

The fundamental object of the present invention is to avoid these difficulties by providing a cam shaft mounting which will avoid end play of the shaft and thus eliminate noise, and which will at the same time permit any differential expansion between the cam shaft and the crank case so as to avoid injury to the bearings. Such is accomplished by providing a novel arrangement of combination radial and thrust bearings and a cooperating spring acting on the shaft in such relation that the spring pressure eliminates end play but permits thermal expansion of the shaft.

Another feature of the present cam shaft mounting is an arrangement whereby timing adjustments of the cam shaft can be readily made, consisting in mounting one of the combination radial and thrust bearing members on a closure plate removably mounted over an opening in the crank case so that the removal of said closure plate also removes said bearing members and affords access to the end of the cam shaft.

Referring to the accompanying drawing wherein I have illustrated a preferred embodiment of my invention:

Fig. 1 is a sectional view through the engine crank case, illustrating the present cam shaft mounting, and Fig. 2 is an end view of the bearing retainer at the inner end of the cam shaft, viewed from the open end.

For the purposes of illustration, I have shown my improved cam shaft mounting embodied in a tractor engine of a two cylinder type, the reversing end throw of the cam shaft being more pronounced in these two cylinder engines, but I wish it to be understood that the invention also has utility in other types of engines. The crank case is fragmentarily indicated at 4, and mounted in the end walls 4' thereof are bearings 5 for the crank shaft 6, only one of such bearings being shown. The crank bearing of one of the connecting rods is indicated at 7. Mounted on the crank shaft 6 adjacent to one end wall of the crank case is a spiral or skew gear 8 which meshes with a similar gear 9 keyed to the cam shaft 10.

In some instances the gear 9 is constructed in the form of a double gear having an inner set of teeth 11 for driving a pinion 12 which is mounted on a shaft 13 leading to an oil pump, governor, or other accessory device of the engine.

The cam shaft is usually mounted adjacent to one of the side walls of the crank case, with the cams 15 thereon engaging cam followers, not shown, which transmit valve opening movement through tappet rods and tappet levers to the valves in the end of the cylinders, as is well known. The inner end of the cam shaft is mounted in an anti-friction bearing 16 which is supported in a boss 17 formed as a part of the crank case, and the outer end of the cam shaft is similarly mounted in an anti-friction bearing 18 which is supported in the end wall 4' of the crank case. Both of these bearings are tapered roller bearings designed for carrying end thrust as well as radial loads, each consisting of an inner race 19, an outer race 20, and a series of tapered rollers 21 rolling between said races and suitably confined in a cage. The inner races, which have their outer ends beaded or flanged outwardly to present endwise displacement of the rollers therefrom, are mounted on reduced ends 23 and 24 of the cam shaft, on which ends these races preferably have a pressed fit. At the gear end of the cam shaft a washer 25 is preferably interposed between the end of the inner race and the hub of the valve gear 9.

Both bearings 16 and 18 are mounted in cup-shaped retainer sleeves 27 and 28, respectively, in which the outer races of the bearings have a pressed fit so that they cannot turn therein. The retainer 27 has a sliding fit in the long guide bore 17' of the boss 17, and a relatively heavy compression spring 29 is confined between the closed end of the retainer and the end wall of the guide bore 17'. A boss 31 is punched rearwardly from the closed end of the retainer to serve as a centering projection to maintain the end of the spring 29 properly centered with respect to the retainer. To permit the bearing retainer to slide longitudinally while still holding it against rotation with the bearing, a pin 32 is extended through one wall of the guide boss 17 to engage in a longitudinal slot 33 punched out in the outer wall of the retainer. Also punched from the outer wall of the retainer are lugs 34 which are bent inwardly to provide a plurality of equidistantly spaced stops for engaging the end of the outer race 20 and holding it in place in the retainer. The pressure of the spring 29 imposed on the retainer is transmitted through these lugs 34 to the thrust bearing 16.

The bearing retainer 28 at the other end of the shaft has a free fit in an opening 36 in the end wall 4' of the crank case. The closed end of such retainer is rigidly secured, as by spot welding, to the inner side of a closure plate 37 which extends beyond the margins of the opening 36 for closing the same.

A sealing gasket 38 is interposed between the projecting portion of said closure plate and the outer side of the crank case to prevent leakage of lubricant, and the assembly of the retainer and closure plate is rigidly secured to the crank case by cap screws 39 which pass through spaced openings in the plate and tap into threaded openings in the wall of the crank case. By simply removing the cap screws 39 the entire assembly consisting of the closure plate 37, retainer sleeve 28 and outer bearing race 20 can be readily withdrawn from the end of the cam shaft.

It will be apparent from the foregoing that the pressure of the spring 29 will force the cam shaft 10 to the left holding the shaft in a definite position with the bearing 18 at the gear end of the shaft serving as a fixed stop for determining the position of the shaft. The angle or inclination of the teeth on the two spiral gears is preferably such that the driving thrust set up in the cam shaft in the operation of opening a valve acts toward the left so that this thrust is also carried by the left hand bearing 18. The oppositely acting thrust which is set up in the cam shaft by the pressure of the valve spring reacting through the reverse slope of the cam and tending to drive the cam shaft ahead of the crank shaft is resisted by the spring 29, which is made sufficiently strong to overcome this oppositely acting thrust and thus hold the cam shaft in its definite longitudinal position. Hence, the present cam shaft mounting eliminates all end throw or lash of the shaft, resulting in a more quiet operation and less wear on the bearings and gears.

When different expansion occurs between the cam shaft and the crank case the spring 29 yields slightly to accommodate the same.

When it is desired to adjust the timing of the cam shaft the end closure plate 37 is removed, which withdraws the retainer and outer race of the bearing 18 thus freeing this end of the shaft so that it can be lifted vertically. The housing 41 which encloses the pinion 12 and shaft 13 is also released, by removing the screws 42 securing said housing to the crank case 4. Thereupon the gear 9, together with the gear 12, can be raised to clear the teeth of the gear 9 from the teeth of the gear 8 so as to permit the desired timing change. In replacing the closure plate 37 after the parts have been restored to proper position, the pressure which can be exerted on said plate in drawing up the cap screws 39 is sufficient to overcome the pressure of the spring 29 and permit the bearing 18 to be properly located in the end wall 4' of the crank case.

Having thus described my invention what I claim as new and desire to secure by Letters Patent is:

1. The combination with an internal combustion engine comprising a crank shaft, a cam shaft, spiral gears for driving said cam shaft from said crank shaft, of bearing members for said cam shaft, one of said bearing members preventing axial movement thereof in one direction but permitting axial movement in the opposite direction, and spring means exerting an end thrust on said cam shaft in the first mentioned direction.

2. The combination with an internal combustion engine comprising a crank shaft, a cam shaft, spiral gears for driving said cam shaft from said crank shaft, of combination radial and thrust bearings supporting said cam shaft at spaced points, a retainer for one of said bearings, and spring means transmitting thrusting pressure to said latter bearing through said retainer.

3. The combination with an internal combustion engine comprising a crank shaft, a cam shaft, spiral gears for driving said cam shaft from said crank shaft, of anti-friction combination radial and thrust bearings supporting the end portions of said cam shaft, a retainer for one of said bearings, guide means in which said retainer is slidably and non-rotatably mounted, and spring means transmitting end pressure to said cam shaft through said bearing retainer.

4. The combination with an internal combustion engine comprising a crank shaft, a cam shaft, a spiral gear mounted on said cam shaft adjacent to one end thereof, a spiral gear mounted on said crank shaft meshing therewith, of an anti-friction radial and thrust bearing stationarily mounted at the gear end of said cam shaft and supporting the same, an anti-friction radial and thrust bearing slidably mounted at the opposite end of said cam shaft and supporting the same, and spring means transmitting end pressure to said cam shaft through said latter bearing.

5. The combination with an internal combustion engine comprising a crank shaft, a cam shaft, spiral gears for driving said cam shaft from said crank shaft, of tapered roller radial and thrust bearings for said cam shaft, a retainer for one of said bearings, a guide boss in which said retainer is mounted, means permitting axial shifting but preventing rotation of said retainer in said guide boss, and spring means transmitting end pressure to said cam shaft through said retainer.

6. The combination with an internal combustion engine comprising a crank shaft, a cam shaft, spiral gears for driving said cam shaft from said crank shaft, of a tapered roller combination radial and thrust bearing supporting one end of said cam shaft, a retainer in which the outer race of said bearing is mounted, lugs punched inwardly from said retainer for transmitting end pressure to said outer race, guide means in which said retainer is slidably and non-rotatably mounted, a compression spring transmitting end pressure to said cam shaft through said retainer and thrust bearing, and a projection extending from said retainer for centering the end of said spring.

7. In an internal combustion engine, the combination of a crank case, crank and cam shafts mounted therein, spiral gears for driving said cam shaft from said crank shaft, said crank case having an opening therein in alignment with one end of said cam shaft, a closure plate removably secured to said crank case over said opening, a retainer member carried by said closure plate and extending into said opening, an anti-friction roller bearing mounted in said retainer and supporting one end of said cam shaft, the outer race of said bearing being removable with said retainer and closure plate in the removal of the latter from said opening, an anti-friction bearing adjacent to the opposite end of said cam shaft, and spring means transmitting end pressure through said latter bearing to said cam shaft in a direction toward said first mentioned bearing.

In witness whereof I hereunto subscribe my name this 14th day of August, 1928.

HAROLD E. McCRAY.